US009201791B2

(12) United States Patent
Saund et al.

(10) Patent No.: US 9,201,791 B2
(45) Date of Patent: Dec. 1, 2015

(54) FLOW-ID DEPENDENCY CHECKING LOGIC

(71) Applicant: Apple Inc., Cupertino, CA (US)

(72) Inventors: Gurjeet S. Saund, Saratoga, CA (US); Harshavardhan Kaushikkar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 388 days.

(21) Appl. No.: 13/736,245

(22) Filed: Jan. 8, 2013

(65) Prior Publication Data
US 2014/0195740 A1 Jul. 10, 2014

(51) Int. Cl.
G06F 12/08 (2006.01)
G06F 13/18 (2006.01)
G06F 9/46 (2006.01)

(52) U.S. Cl.
CPC .............. G06F 12/0815 (2013.01); G06F 9/46 (2013.01); G06F 12/0811 (2013.01); G06F 13/18 (2013.01)

(58) Field of Classification Search
None
See application file for complete search history.

(56) References Cited

U.S. PATENT DOCUMENTS

| | | | | |
|---|---|---|---|---|
| 5,655,096 A * | 8/1997 | Branigin | ........................ | 712/200 |
| 5,826,089 A * | 10/1998 | Ireton | ............................ | 717/146 |
| 6,266,767 B1 * | 7/2001 | Feiste et al. | .................... | 712/217 |
| 6,725,358 B1 * | 4/2004 | Moore | ........................... | 712/216 |
| 6,728,866 B1 * | 4/2004 | Kahle et al. | .................... | 712/215 |
| 7,181,598 B2 * | 2/2007 | Jourdan et al. | ................. | 712/217 |
| 7,320,063 B1 * | 1/2008 | Grohoski et al. | .............. | 712/214 |
| 2002/0147869 A1 * | 10/2002 | Owen et al. | .................... | 710/105 |
| 2005/0193041 A1 * | 9/2005 | Bourbonnais et al. | ........ | 707/204 |
| 2006/0106987 A1 * | 5/2006 | Barrick et al. | ................. | 711/125 |
| 2006/0271767 A1 * | 11/2006 | Osanai et al. | .................. | 712/216 |
| 2007/0074005 A1 * | 3/2007 | Abernathy et al. | ........... | 712/214 |
| 2007/0220517 A1 | 9/2007 | Lippett | | |
| 2008/0109624 A1 * | 5/2008 | Gilbert et al. | ................. | 711/163 |
| 2009/0006672 A1 | 1/2009 | Blumrich et al. | | |
| 2010/0250902 A1 * | 9/2010 | Abernathy et al. | ........... | 712/216 |
| 2010/0306509 A1 * | 12/2010 | Day et al. | ....................... | 712/217 |
| 2010/0332804 A1 * | 12/2010 | Golla et al. | .................... | 712/214 |
| 2010/0332806 A1 * | 12/2010 | Golla et al. | .................... | 712/216 |
| 2012/0047514 A1 | 2/2012 | Seo et al. | | |
| 2012/0079154 A1 | 3/2012 | Mangano et al. | | |
| 2012/0150829 A1 * | 6/2012 | Bourbonnais et al. | ........ | 707/703 |
| 2012/0311273 A1 * | 12/2012 | Marathe et al. | ............... | 711/151 |
| 2013/0297912 A1 * | 11/2013 | Tran et al. | ...................... | 712/208 |
| 2014/0173342 A1 * | 6/2014 | Kaushikkar et al. | ............ | 714/30 |
| 2014/0181419 A1 * | 6/2014 | Saund et al. | ................... | 711/146 |
| 2014/0181824 A1 * | 6/2014 | Saund et al. | ................... | 718/102 |
| 2014/0189411 A1 * | 7/2014 | Kanchana et al. | ............ | 713/324 |

FOREIGN PATENT DOCUMENTS

WO 2005096143 10/2005

OTHER PUBLICATIONS

Bruce Jacob et al. Memory Systems: Cache, DRAM, Disk, pp. 240-256, 2008.*

* cited by examiner

Primary Examiner — Cheng-Yuan Tseng
Assistant Examiner — Rocio Del Mar Perez-Velez
(74) Attorney, Agent, or Firm — Rory D. Rankin; Meyertons, Hood, Kivlin, Kowert & Goetzel, P.C.

(57) ABSTRACT

Systems and methods for maintaining an order of transactions in the coherence point. The coherence point stores attributes associated with received transactions in an input request queue (IRQ). When a new transaction is received with a device ordered attribute, the IRQ is searched for other entries with the same flow ID as the new transaction. If one or more matches are found, the new transaction entry points to the entry for the most recently received transaction with the same flow ID. The new transaction is prevented from exiting the coherence point until the transaction it points to has been sent to its destination.

24 Claims, 7 Drawing Sheets

FLOW-ID DEPENDENCY CHECKING LOGIC

BACKGROUND

1. Field of the Invention

The present invention relates generally to the field of computer systems, and in particular to methods and mechanisms for maintaining order among memory transactions.

2. Description of the Related Art

A system on chip (SoC) often includes multiple input/output (I/O) devices and a processor sharing one or more memory devices via a memory controller. Many different agents may generate memory transactions and convey these memory transactions to the memory controller. Often, a coherence point is used to maintain the ordering and coherence of these memory transactions within the SoC.

In one embodiment, each transaction received by a coherence point may include a flow-identifier (ID) identifying which flow the transaction is a part of. A flow may be defined as a series of transactions or requests from the same source to the same destination. Transactions with the same flow-ID should be issued out of the coherence point in the order in which they were received. However, the coherence point may store the transactions in a queue which is not a first-in-first-out (FIFO) queue, and so the order of entries in the queue is not an indication of order.

SUMMARY

Systems and methods for managing transactions with flow-ID dependencies within a coherence point are contemplated.

A system on chip (SoC) may include a processor complex, a memory controller, a coherence point, and a switch fabric. The coherence point may include one or more current transaction tables (CTTs), and each CTT may include an input request queue (IRQ) for storing transactions received from the switch fabric. Each entry in the IRQ may store attributes associated with a corresponding transaction, including a flow ID field. In one embodiment, the flow-ID field may be a concatenation of the source ID and virtual channel (VC) fields. Each entry of the IRQ may also include a head pointer field which points to a separate entry that the original entry is dependent upon. If an entry is the head of the linked-list, than the head-pointer of this entry references itself. Also, if a transaction is not dependent on any other transactions and thus is not part of a linked-list, the head pointer of the corresponding entry for this transaction will also point to itself.

The coherence point may include logic for determining if a newly received transaction with a device ordered attribute is dependent on any of the outstanding transactions with entries in the CTT(s). In one embodiment, the newly received transaction may be part of a given flow-ID. The dependency checking logic may determine if the given flow-ID matches the flow-ID of any of the currently outstanding transactions stored in the coherence point.

If the new transaction is dependent on any existing transactions, then the new transaction may be linked to the existing transaction(s) using a linked-list structure. The linked-list structure may be utilized to ensure that the dependent transactions are allowed to proceed in the order in which they were received by the coherence point. If the new transaction is dependent on multiple transactions, then the dependency checking logic may identify the tail of the linked-list and then the new transaction may point to the current tail of the linked-list. Then, the new transaction will become the new tail of the linked-list. When the transaction which is the current head of the linked-list exits the coherence point, then the next transaction in the linked-list may be made the new head of the linked-list. This transaction may have its head-pointer modified so that it points to itself. Then, this transaction may be allowed to be read out of the coherence point.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
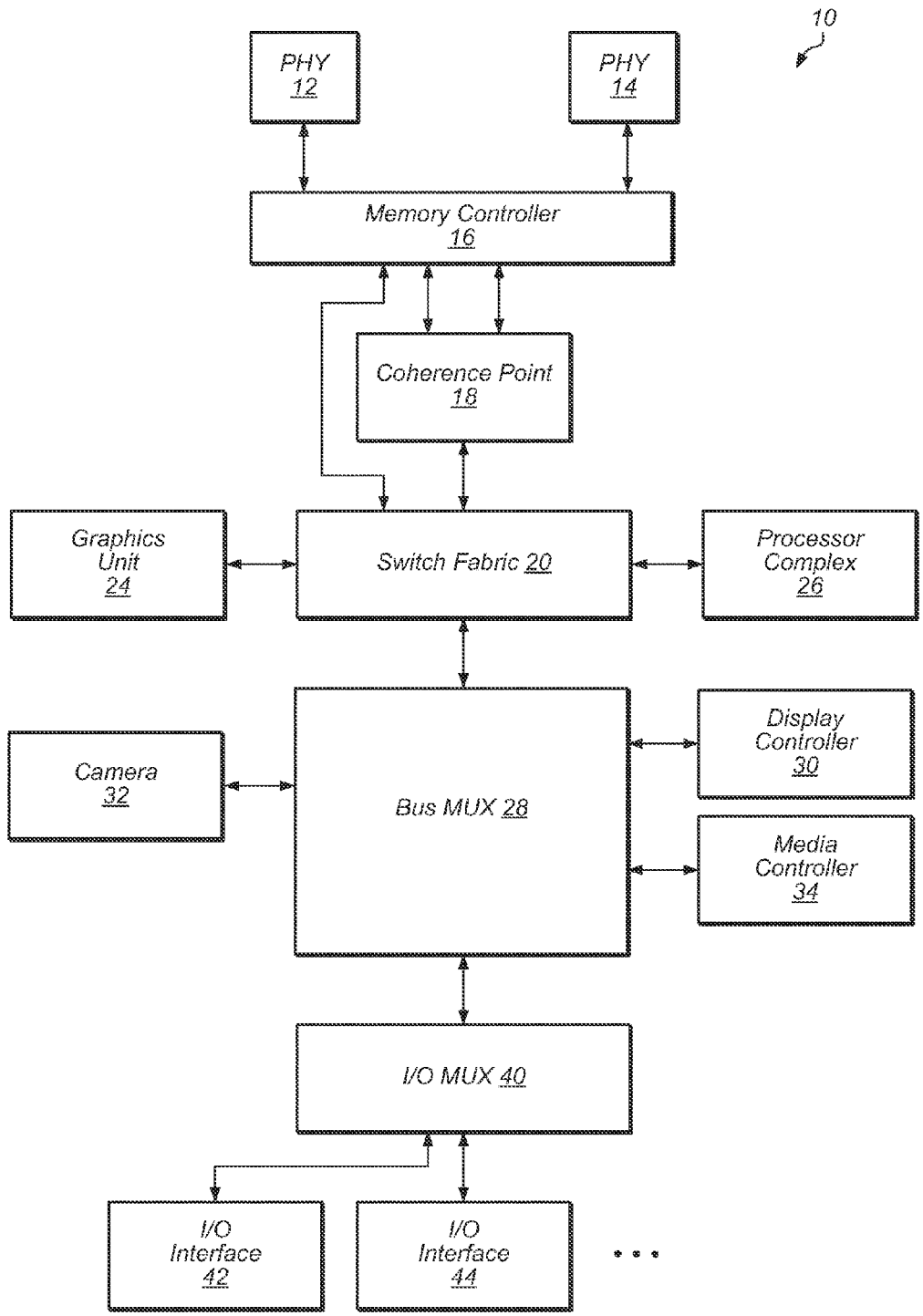
FIG. 1 illustrates a block diagram illustrating one embodiment of a portion of an integrated circuit (IC).

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a coherence point . . . . " Such a claim does not foreclose the apparatus from including additional components (e.g., a processor complex, a memory controller, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a queue having 64 entries, the terms "first" and "second" entries can be used to refer to any two of the 64 entries.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes processor complex 26, coherence point 18, switch fabric 20, graphics unit 24, bus mux 28, display controller 30, media controller 34, camera 32, input/output (I/O) mux 40, I/O interfaces 42 and 44, memory controller 16, and memory physical interface circuits (PHYs) 12 and 14. It is noted that IC 10 may also include many other components not shown in FIG. 1 and/or omit one or more of the components shown. In various embodiments, IC 10 may also be referred to as a system on chip (SoC), an application specific integrated circuit (ASIC), or an apparatus. Clock sources, such as phase lock loops (PLLs), and power sources are not shown for ease of illustration.

Components shown within IC 10 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. Other types of bus and interface mechanisms, such as specialty or proprietary interfaces with custom protocols, may also be utilized to provide connections between any of the various components of IC 10.

Processor complex 26 may include any number of central processing units (CPUs) (not shown), a supporting cache hierarchy including a level two (L2) cache (not shown), and multiple other components and logic. The CPU(s) of processor complex 26 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, coherence point 18, switch fabric 20, bus mux 28, and I/O mux 40 may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

Coherence point 18 may be configured to act as a gateway between the coherent and non-coherent domains in IC 10. Coherence point 18 may be the location in IC 10 where memory operations become globally visible. Coherence point 18 may also include L2 duplicate tags (not shown), which are tags from the L2 cache (in processor complex 26) for all coherent agents in IC 10 and which may be snooped by coherence point 18 for coherency operations. Coherence point 18 may also include additional logic (e.g., coherence control unit, memory interface unit, current transaction table, dependency logic unit) not shown in FIG. 1. For example, in various embodiments, coherence point 18 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 18 may be coupled to switch fabric 20, and coherence point 18 may be coupled to other devices of IC 10 via switch fabric 20. Switch fabric 20 may be used to aggregate traffic from multiple devices within IC 10. In some embodiments, coherence point 18 and switch fabric 20 may be integrated within a single structure which may be referred to as a coherent switch.

Coherence point 18 may allow memory access requests from any requestor in IC 10 to snoop the cache hierarchy of processor complex 26. Thus, data produced by the CPUs of processor complex 26 may not be explicitly flushed for the data to be visible to the other devices and agents of IC 10. If the most recent copy of data is present in the cache hierarchy, then read requests may receive the most recent copy from the cache hierarchy. For write requests, merging may be performed for a cache line present in the cache hierarchy for any requestor in IC 10.

Bus mux 28 is coupled to memory via switch fabric 20, and bus mux 28 is also coupled to display controller 30, media controller 34, and camera 32. Bus mux 28 may also be referred to as an IC mux or SoC mux. In other embodiments, bus mux 28 may also be coupled to other devices (e.g., flash controller) not shown in FIG. 1. Bus mux 28 is also coupled to I/O mux 40, which is coupled to I/O interfaces 42 and 44.

I/O interfaces 42 and 44 are representative of any number of I/O interfaces or devices connected to I/O mux 40. I/O interfaces 42 and 44 may provide interfaces to any type of peripheral device implementing any hardware functionality included in the system. For example, I/O interfaces 42 and 44 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

IC 10 may group processing blocks associated with non-real-time memory performance, such as the media controller 34, for image scaling, rotating, and color space conversion, accelerated video decoding for encoded movies, audio processing and so forth. Camera 32 and media controller 34 may include analog and digital encoders, decoders, and other signal processing blocks. In other embodiments, the IC 10 may include other types of processing blocks in addition to or in place of the blocks shown.

Memory controller 16 may include one or more memory caches (not shown). The memory caches may be used to reduce the demands on memory bandwidth and to reduce power consumption. The allocation policy for the memory caches may be programmable. Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
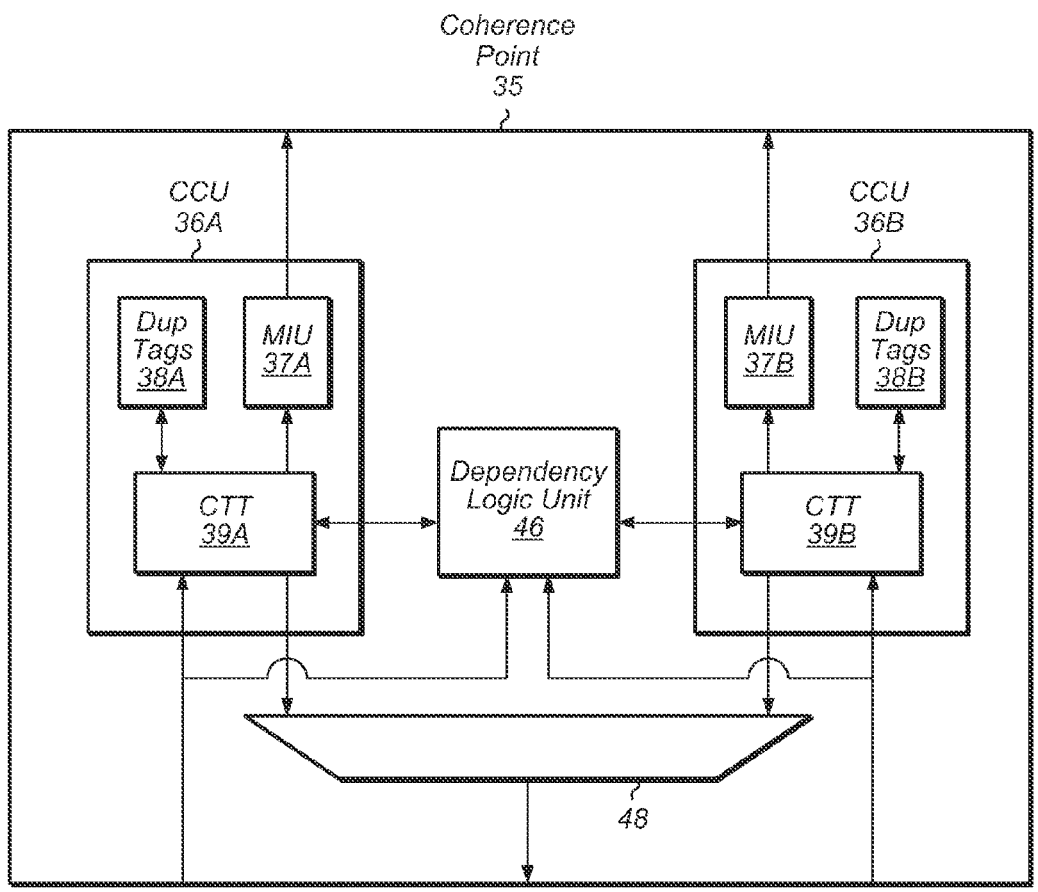
FIG. 2 is a block diagram of one embodiment of a coherence point.

Turning now to FIG. 2, a block diagram of one embodiment of a coherence point is shown. Coherence point 35 may include two separate coherence control units (CCUs) 36A and 36B, which may be referred to as left and right channels, respectively. It is noted that in other embodiments, coherence point 35 may have other numbers of CCUs (e.g., 1, 4, 8). Coherence point 35 may also include dependency logic unit 46. Although dependency logic unit 46 is shown as being external to CCUs 36A and 36B, in other embodiments, unit 46 may be located within CCU 36A and/or CCU 36B. For example, in another embodiment, unit 46 may straddle CCUs 36A and 36B, so that a portion of unit 46 is located within CCU 36A and another portion is located in CCU 36B. Alternatively, unit 46 may be located entirely in either CCU 36A or CCU 36B. Coherence point 35 may also include demux 48 for sending traffic to a switch fabric (not shown) from CCUs 36A and 36B. It is noted that coherence point 35 may also include other logic and units not shown in FIG. 2 to avoid obscuring the figure.

CCU 36A and 36B may include L2 duplicate tags 38A and 38B, respectively. Each L2 duplicate tags 38 may include duplicate tags from the L2 cache(s) in the CPU(s) of the processor complex. CCU 36A and 36B may also include current transaction tables (CTTs) 36A and 36B, respectively. Each CTT 36 may store information associated with the outstanding in-flight transactions that have been received by coherence point 35 but have not yet exited their corresponding CTT 36. It is noted that the term "transaction" may be used to refer to a "memory transaction", "input/output (I/O) transaction", or other type of transaction. Generally speaking, a transaction may comprise a memory request, and the term "memory request" is not limited to requests that are ultimately responded to by memory, but can also include requests that are satisfied by a cache. It is noted that the terms "memory request", "transaction", and "memory operation" may be used interchangeably throughout this disclosure.

Although each CTT 36 is shown as a single block, each CTT 36 may include multiple structures, such as an input request queue (IRQ), victim address queue, victim data queue, CTT entry attribute queue, and one or more other data structures. CTT 36A and 36B may be coupled to memory interface units (MIUs) 37A and 37B, respectively. Each MIU 37 may be configured to provide the interface from coherence point 35 to a memory controller (not shown).

Unit 46 may be configured to check for a flow dependency for a newly received transaction. A flow may be defined as a series of requests from the same source to the same destination. A flow may be identified by the flow identifier (ID), and in one embodiment, the flow ID may be defined as a combination of the source ID and a virtual channel (VC). When a new transaction that is marked as device ordered is received by either CCU 36A or 36B, unit 46 may search the entries of both CTT 36A and 36B for other transactions with the same flow ID as the new transaction. The device ordered attribute is one type of an ordering attributes which may be specified for a given transaction. Another ordering attribute may be the relaxed order attribute, and if a transaction has the relaxed ordered attribute, then unit 46 may not be activated for this transaction since the order in which it is read out of coherence point 35 in relation to other transactions of the same flow is unconstrained.

The new transaction, with the device ordered attribute, may be routed to one of the CCUs based on an address hash function that is performed on the request address of the new transaction. An available entry may be allocated for the new transaction in the corresponding CTT 36A or 36B. If a single matching entry is found with the same flow ID as the new transaction, then a linked list may be created to link together the existing entry with the new entry corresponding to the new transaction. If multiple matching entries are found with the same flow ID as the new transaction, then the new entry may be added to the tail of the existing linked list.

By creating a linked list for transactions with the same flow ID that have the device ordered attribute, the coherence point can ensure the correct order is maintained for these transactions. The coherence point may be configured to block the next transaction in the linked list until the previous transaction in the linked list has been issued to its intended destination. When a transaction at the head of the linked list is issued to its intended destination, the coherence point may be configured to unblock the next transaction in the linked list.

Figure 3:
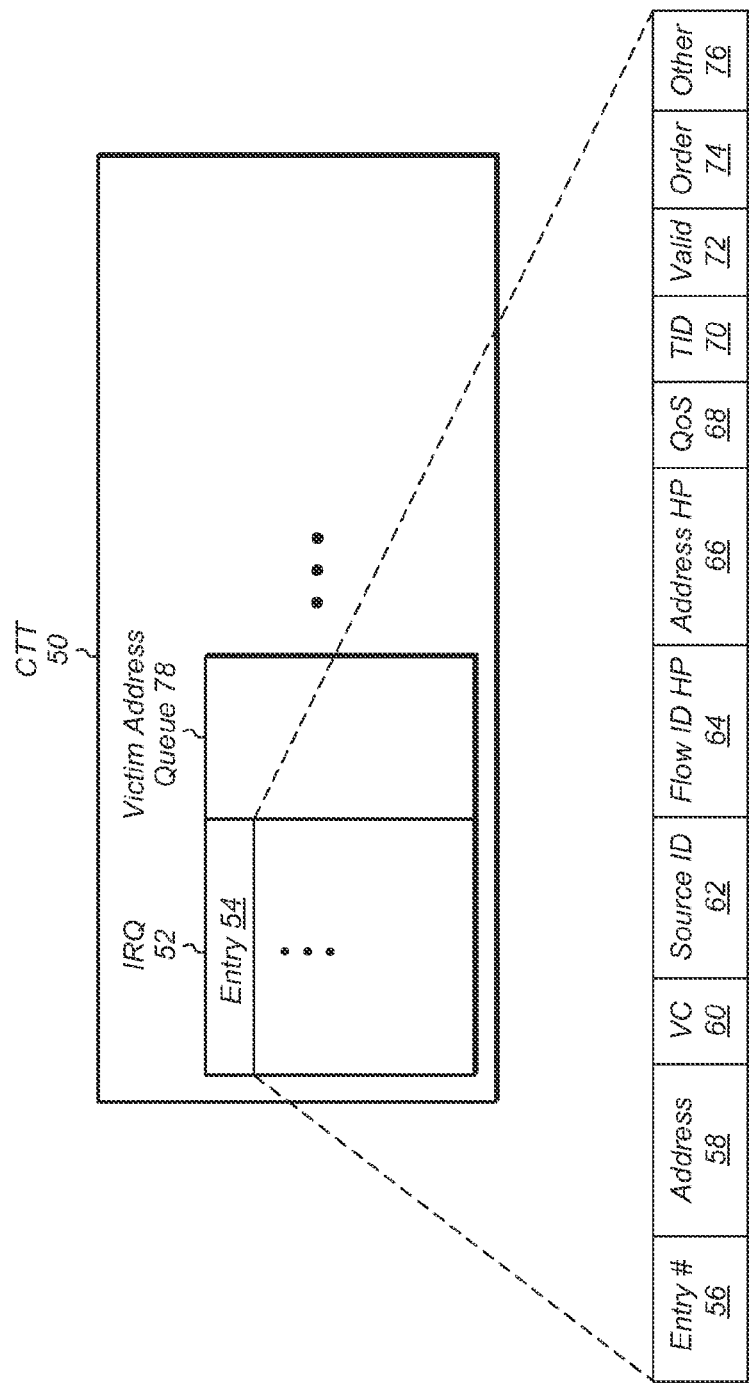
FIG. 3 is a block diagram illustrating one embodiment of an input request queue entry.

Referring now to FIG. 3, a block diagram illustrating one embodiment of an input request queue (IRQ) entry is shown. Current transaction table (CTT) 50 may include multiple queues, such as IRQ 52, victim address queue 78, and other queues, tables, and/or other logic structures. CTT 50 may be located within a coherence point, such as coherence point 35 of FIG. 2. IRQ 52 is representative of any size of queue, with the capacity for storing any number of transactions. In one embodiment, IRQ 52 may store 64 entries, while in other embodiments, IRQ 52 may include other numbers of entries.

Each entry of IRQ 52 may include multiple attributes associated with a transaction that has been received by the coherence point. Entry 54 is expanded in FIG. 3 to show the attributes that may be stored in a typical entry of IRQ 52. For example, in one embodiment, entry 54 may include an entry number 56, request address 58, virtual channel (VC) 60, source ID 62, flow ID dependency head pointer 64, address dependency head pointer 66, quality of service (QoS) indicator 68, transaction ID (TID) 70, valid indicator 72, ordering attribute 74, and other attribute 76, which is representative of any number of other attributes. The ordering attribute 74 may refer to the device ordered attribute, relaxed ordered attribute, or other types of ordering attributes. In other embodiments, entries of IRQ 52 may include various other information associated with the corresponding transactions and/or omit some of the attributes shown in FIG. 3.

When a new transaction with the device ordered attribute is received by the host coherence point, a search may be performed of IRQ 52 to see if the new transaction has a flow-ID dependency on any existing transactions. In one embodiment, the flow ID of the new transaction may be a concatenation of the VC and source ID fields of the new transaction. IRQ 52 may be searched for existing entries to see if the flow ID of the new transaction matches any flow IDs of existing entries. Also, if the host coherence point has more than one channel, than the other IRQs for the other channels may also be searched for existing transactions with the same flow ID as the new transaction. In addition, after the new transaction is received, an available entry may be allocated to store attributes associated with the new transaction.

If no matches are found between the new transaction and the existing entries in IRQ 52 (or in any other IRQs) for the flow ID, then the flow ID head pointer 64 for the new transaction's entry in IRQ 52 may point to itself. If one match is found, then the flow ID head pointer 64 for the new entry may point to this matching entry. If multiple matches are found, then the flow ID head pointer 64 for the new entry may point to the entry which is the tail (i.e., most recently received transaction) of the multiple matching entries. If multiple matches are found, then this means there is already a linked list for this particular flow ID, and the tail of the linked list may be identified, and then the new entry for the new transaction may have its flow ID head pointer 64 point to this tail entry of IRQ 52 (or another IRQ).

Figure 4:
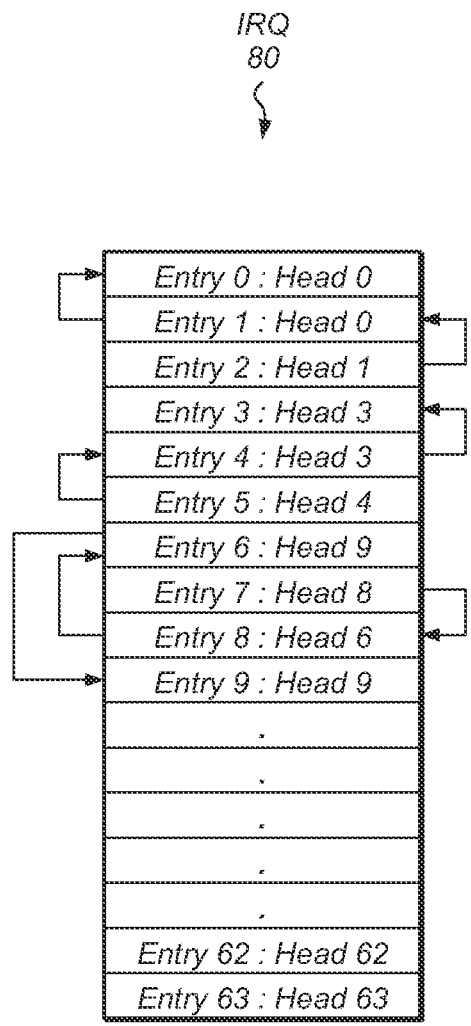
FIG. 4 is a block diagram of one embodiment of a linked-list structure.

Referring now to FIG. 4, one embodiment of a linked-list structure is shown. IRQ 80 is one example of an IRQ which utilizes a linked-list structure to manage dependencies between entries corresponding to outstanding transactions. The entries shown in FIG. 4 display the entry numbers and the flow ID head pointer fields only, although the entries may include many other attributes which are not shown for ease of illustration. For example, the first entry "Entry 0: Head 0" indicates that this is entry number 0 and that the flow ID head pointer references entry 0. Therefore, this entry may be permitted to exit the coherence point when selected by the coherence point's arbiter.

It will be assumed for the purposes of this discussion that IRQ 80 has 64 entries numbered 0-63. However, in other embodiments, an IRQ may include other numbers of entries. Also, in other embodiments, the linked-list structure shown in FIG. 4 may be split up into two or more separate queues, but each entry may point to entries in the same queue or to entries in other queues. For example, a first queue may have 32 entries numbered from 0-31 and a second queue may have 32 entries numbered from 32-63. The head pointer in any entry may reference any entry numbered from 0-63, so that in an entry in the first queue may reference an entry in the second queue and vice versa.

In one embodiment, the entries with the head pointers may be stored within an IRQ. In another embodiment, the entries with the head pointers may be located within another structure of the CTT. Alternatively, in a further embodiment, the head pointers forming the linked-list structure may be located external to the CTT within the host coherence point.

As shown in FIG. 4, there are three different linked-lists that are stored in IRQ 80. Entries 0, 1, and 2 form a linked-list, with entry 2 pointing to entry 1 and entry 1 pointing to entry 0. Since entry 0 points to itself, it is the head of the list, while entry 2 is the tail of the list. A second linked-list stored in IRQ 80 includes entries 3, 4, and 5. Entry 5 points to entry 4 which points to entry 3. Entry 3 is the head of this linked-list since it points to itself and entry 5 is the tail of the list. A third list includes entries 6, 7, 8, and 9. Entry 7 points to entry 8, which points to entry 6, which points to entry 9. Entry 9 is the head of this linked-list and entry 7 is the tail of the list. For each of the linked-lists shown in IRQ 80, only the head of each linked-list may be allowed to be read out of IRQ 80. The other transactions will be blocked until the transaction pointed to by their flow ID head pointer field is read out of IRQ 80. Entries 62 and 63 are also shown in IRQ 80, and these entries correspond to transactions without a flow ID dependency. At any given time, any number of entries in IRQ 80 may be without a flow ID dependency.

Figure 5:
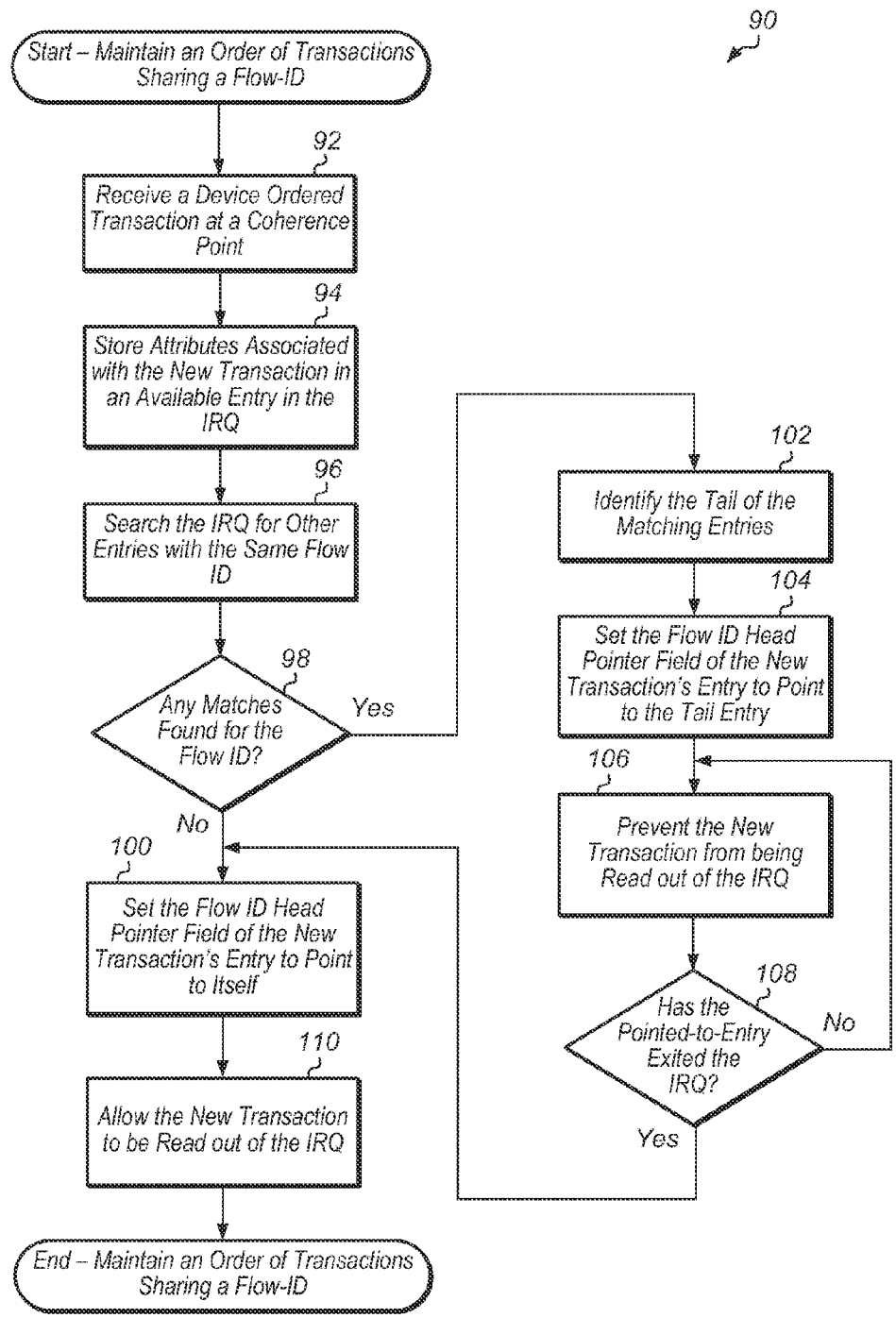
FIG. 5 is a generalized flow diagram illustrating one embodiment of a method for maintaining an order of transactions sharing a flow-ID.

Referring now to FIG. 5, one embodiment of a method 90 for maintaining an order of transactions sharing a flow-ID is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a new transaction with a device ordered attribute may be received at a coherence point (block 92). Attributes associated with the new transaction may be stored in an available entry in the IRQ (block 94). The attributes that are stored in the available entry may include a request address, a virtual channel (VC), a source ID, QoS level, transaction ID, and one or more other attributes. A flow ID of the transaction may be defined as the concatenation of the VC and source ID. In one embodiment, the IRQ may not be a first-in, first-out (FIFO) queue. Therefore, to maintain an order of transactions with the same flow ID in accordance to the order in which they were received by the coherence point, a linked-list may be created within the IRQ for each group of transactions sharing a flow-ID.

Next, the IRQ may be searched for other entries with the same flow ID as the new transaction (block 96). It is noted that blocks 94 and 96 may be performed concurrently, or alternatively, block 96 may be performed prior to block 94. It is also noted that there may be multiple channels within the coherence point, and each channel may have its own IRQ. In these embodiments, all of the entries in all of the IRQs of the coherence point may be searched for transactions with the same flow ID. Also, in some cases, the search may be restricted to entries for transactions with the device ordered attribute.

If a match is found with the flow ID of one or more other entries (conditional block 98, "yes" leg), the tail of the matching entries may be identified (block 102). If only a single match is found, then this matching entry will be considered the tail. If no matches are found with the flow ID of one or more other entries (conditional block 98, "no" leg), then the head pointer of the new entry for the new transaction may point to itself (block 100).

After the tail entry is identified in block 102, the head pointer of the new entry for the new transaction may point to the tail entry (block 104). Then, the coherence point may prevent the new transaction from being read out of the IRQ for as long as its head pointer points to another entry in the IRQ (block 106). Next, if the coherence point determines the entry pointed to by the new transaction's head pointer has been read out of the IRQ (conditional block 108, "yes" leg), then the head pointer may be set to point to itself (block 100). If the coherence point determines the entry pointed to by the new transaction's head pointer is still in the IRQ (conditional block 108, "no" leg), then method 90 may return to block 106 and prevent the new transaction from being read out of the IRQ. After block 102, the coherence point may allow the new transaction to be read out of the IRQ (block 110). After block 110, method 90 may end.

Figure 6:
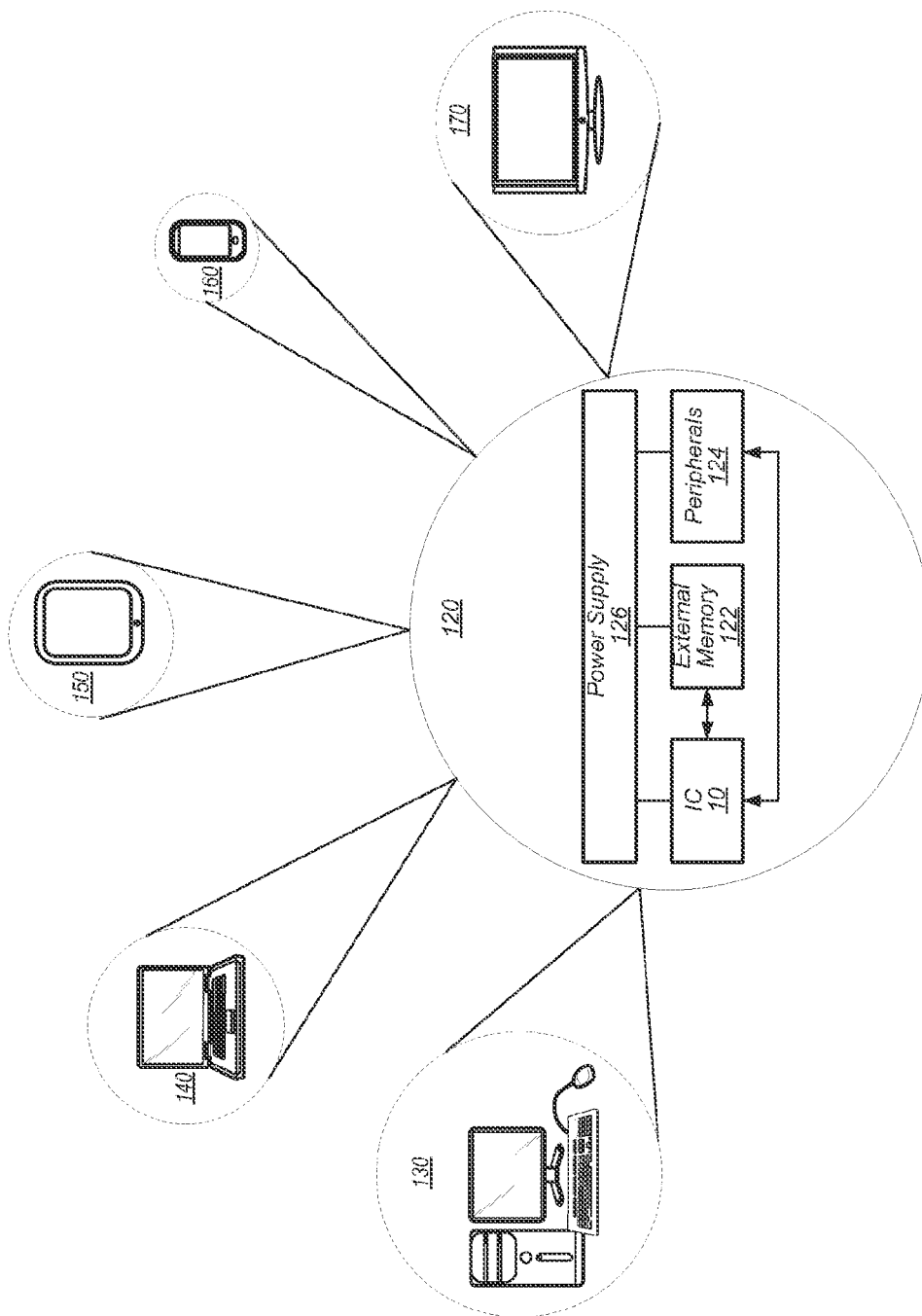
FIG. 6 is a block diagram of one embodiment of a system.

Turning now to FIG. 6, a block diagram of one embodiment of a system 120 is shown. As shown, system 120 may represent chip, circuitry, components, etc., of a desktop computer 130, laptop computer 140, tablet computer 150, cell phone 160, television 170 (or set top box configured to be coupled to a television), or otherwise. In the illustrated embodiment, the system 120 includes at least one instance of IC 10 (of FIG. 1) coupled to an external memory 122.

IC 10 is coupled to one or more peripherals 124 and the external memory 122. A power supply 126 is also provided which supplies the supply voltages to IC 10 as well as one or more supply voltages to the memory 122 and/or the peripherals 124. In various embodiments, power supply 126 may represent a battery (e.g., a rechargeable battery in a smart phone, laptop or tablet computer). In some embodiments, more than one instance of IC 10 may be included (and more than one external memory 122 may be included as well).

The memory 122 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 124 may include any desired circuitry, depending on the type of system 120. For example, in one embodiment, peripherals 124 may include devices for various types of wireless communication, such as wifi, Bluetooth, cellular, global positioning system, etc. The peripherals 124 may also include additional storage, including RAM storage, solid state storage, or disk storage. The peripherals 124 may include user interface devices such as a display screen, including touch display screens or multitouch display screens, keyboard or other input devices, microphones, speakers, etc.

Figure 7:
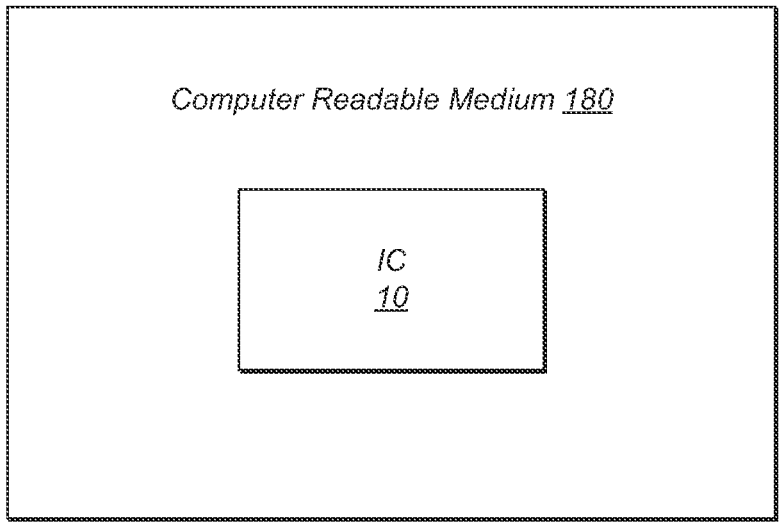
FIG. 7 is a block diagram of one embodiment of a computer readable medium.

Referring now to FIG. 7, one embodiment of a block diagram of a computer readable medium 180 including one or more data structures representative of the circuitry included in IC 10 (of FIG. 1) is shown. Generally speaking, computer readable medium 180 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 180 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 180 may be the netlist(s) (with or without the synthesis library) or the data set(s), as desired. In yet another alternative, the data structures may comprise the output of a schematic program, or netlist(s) or data set(s) derived therefrom. While computer readable medium 180 includes a representation of IC 10, other embodiments may include a representation of any portion or combination of portions of IC 10 (e.g., coherence point 18).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   one or more queues, wherein each queue stores a plurality of outstanding transactions; and
   a dependency logic unit coupled to the one or more queues, wherein the dependency logic unit is configured to:

determine whether a received first transaction has a device ordered attribute, wherein a device ordered attribute is an attribute applied to a given transaction by a source of the given transaction that indicates the given transaction is to be processed in order with respect to other transactions issued by the source that also have a device ordered attribute and have a same flow identifier (ID); and in response to determining the first transaction has a device ordered attribute:
  search the one or more queues for transactions with a flow ID that matches a flow ID of the first transaction; and
  mark the first transaction as dependent on a second transaction responsive to determining the second transaction is a most recently received transaction in the one or more queues with a flow ID matching the flow ID of the first transaction.

2. The apparatus as recited in claim 1, wherein the apparatus is configured to prevent the first transaction from exiting the one or more queues until the second transaction exits the one or more queues, in response to detecting the marked first transaction.

3. The apparatus as recited in claim 2, wherein marking the first transaction as dependent on the second transaction comprises setting a pointer field of the first transaction to reference the second transaction.

4. The apparatus as recited in claim 3, wherein the apparatus is configured to store attributes associated with the first transaction in a first entry of a given queue, wherein each entry of the given queue includes a pointer field configured to store a pointer to an entry of the given queue.

5. The apparatus as recited in claim 4, wherein the apparatus is configured to set the pointer field of the first transaction to reference itself responsive to the second transaction exiting the queue.

6. The apparatus as recited in claim 1, wherein a flow is a series of requests from a same source to a same destination and a flow ID identifies a given flow.

7. A method comprising:
determining whether a received first transaction has a device ordered attribute, wherein a device ordered attribute is an attribute applied to a given transaction by a source of the given transaction that indicates the given transaction is to be processed in order with respect to other transactions issued by the source that also have a device ordered attribute and have a same flow identifier (ID); and in response to determining the first transaction has a device ordered attribute:
  searching a queue for transactions with a flow ID that match a flow ID of the first transaction; and
  marking the first transaction as dependent on a second transaction in the queue responsive to determining the second transaction is a most recently received transaction in the queue with a flow ID matching the flow ID of the first transaction.

8. The method as recited in claim 7, further comprising preventing the first transaction from exiting the queue until the second transaction exits the queue.

9. The method as recited in claim 8, further comprising storing attributes associated with the first transaction in a first entry of the queue.

10. The method as recited in claim 9, wherein the attributes comprise a pointer field, and wherein marking the first transaction comprises setting the pointer field of the first entry to reference an entry corresponding to the second transaction.

11. The method as recited in claim 10, wherein each entry of the queue includes a pointer field configured to store a pointer to an entry of the queue.

12. The method as recited in claim 7, wherein a flow is a series of requests from a same source to a same destination and a flow ID identifies a given flow.

13. The method as recited in claim 7, wherein the coherence point includes level two (L2) duplicate tags, wherein the method further comprising permitting the first transaction to search the L2 duplicate tags prior to the second transaction exiting the queue.

14. A method comprising:
receiving a first transaction with a first flow identifier (ID) at a coherence point, wherein the first transaction has a device ordered attribute, wherein a device ordered attribute is an attribute applied to a given transaction by a source of the given transaction that indicates the given transaction is to be processed in order with respect to other transactions issued by the source that also have a device ordered attribute and have a same flow ID;
searching a queue for any transactions that have a flow ID matching the first flow ID and the device ordered attribute;
setting a first pointer corresponding to the first transaction to reference itself responsive to finding no transactions with the first flow ID in the queue; and
setting the first pointer to reference a second transaction responsive to finding one or more transactions with the first flow ID and the device ordered attribute, wherein the second transaction is a most recently received transaction in the queue with both the first flow ID and the device ordered attribute.

15. The method as recited in claim 14, further comprising preventing the first transaction from exiting the queue responsive to determining the first pointer references the second transaction.

16. The method as recited in claim 15, further comprising allowing the first transaction to exit the queue responsive to determining the first pointer references itself.

17. The method as recited in claim 16, further comprising storing a plurality of attributes associated with the first transaction in a first entry of the queue.

18. The method as recited in claim 17, wherein each entry of the queue includes a pointer field configured to store a pointer to an entry of the queue.

19. The method as recited in claim 18, further comprising setting the first pointer to reference itself responsive to reading the second transaction out of the queue.

20. An apparatus comprising:
a coherence point, wherein the coherence point comprises:
  one or more queues, wherein each queue of the one or more queues stores a plurality of outstanding transactions;
  a dependency logic unit coupled to the one or more queues; and
a memory controller coupled to the coherence point;
wherein the coherence point is configured to:
  determine whether a received first transaction has a device ordered attribute, wherein a device ordered attribute is an attribute applied to a given transaction by a source of the given transaction that indicates the given transaction is to be processed in order with respect to other transactions issued by the source that also have a device ordered attribute and have a same flow ID; and
  in response to determining the first transaction has a device ordered attribute:

search a flow identifier (ID) field of each entry of the one or more queues for a match to a first flow ID matching a flow ID of the first transaction;
identify a most recently received transaction in the queue with the flow ID responsive to finding multiple entries with the flow ID in the one or more queues;
store the first transaction in a first entry of the one or more queues;
update a pointer field of the first entry to reference a second entry, wherein the second entry stores said most recently received transaction flow ID; and
prevent the first transaction from exiting the coherence point until said most recently received transaction has exited the coherence point.

21. The apparatus as recited in claim 20, wherein the coherence point is further configured to allow the first transaction to be sent to the memory controller responsive to determining said most recently received transaction has been sent to the memory controller.

22. The apparatus as recited in claim 20, wherein a flow is a series of requests from a same source to a same destination and a flow ID identifies a given flow.

23. The apparatus as recited in claim 20, wherein each entry of the one or more queues includes a pointer field configured to store a pointer to an entry of the one or more queues.

24. The apparatus as recited in claim 20, wherein the flow ID is a concatenation of a source ID and a virtual channel.

* * * * *